(12) United States Patent
Vummintala et al.

(10) Patent No.: US 11,589,351 B2
(45) Date of Patent: Feb. 21, 2023

(54) LARGER BANDWIDTHS AND HIGHER DATA RATES FOR EMTC

(71) Applicant: QUALCOMM Incorporated, San Diego, CA (US)

(72) Inventors: Shashidhar Vummintala, Bangalore (IN); Gowrisankar Somichetty, Bangalore (IN); Kapil Bhattad, Bangalore (IN); Alberto Rico Alvarino, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 99 days.

(21) Appl. No.: 16/332,497

(22) PCT Filed: Sep. 29, 2017

(86) PCT No.: PCT/US2017/054515
§ 371 (c)(1),
(2) Date: Mar. 12, 2019

(87) PCT Pub. No.: WO2018/064586
PCT Pub. Date: Apr. 5, 2018

(65) Prior Publication Data
US 2019/0230664 A1 Jul. 25, 2019

(30) Foreign Application Priority Data
Sep. 30, 2016 (IN) .............. 201641033513

(51) Int. Cl.
*H04W 72/04* (2009.01)
*H04W 72/0453* (2023.01)
(Continued)

(52) U.S. Cl.
CPC ........ *H04W 72/0453* (2013.01); *H04B 1/713* (2013.01); *H04L 5/0039* (2013.01);
(Continued)

(58) Field of Classification Search
CPC .......... H04W 72/0453; H04W 72/042; H04W 24/08; H04W 4/70; H04L 5/0044; H04L 5/0039; H04B 1/713
See application file for complete search history.

(56) References Cited

U.S. PATENT DOCUMENTS 9,241,287 B2    1/2016  Montojo et al.
10,652,872 B2 *  5/2020  You ........................ H04W 74/08
(Continued)

FOREIGN PATENT DOCUMENTS

CN    103379552 A    10/2013
CN    104053241 A    9/2014
(Continued)

OTHER PUBLICATIONS

International Search Report and Written Opinion—PCT/US2017/054515—ISA/EPO—dated Dec. 19, 2017.
(Continued)

*Primary Examiner* — Saumit Shah
(74) *Attorney, Agent, or Firm* — Patterson+ Sheridan, L.L.P.

(57) ABSTRACT

Certain aspects of the present disclosure provide techniques for higher bandwidth and data rate for enhanced machine type communications (eMTC). According to certain aspects, a method of wireless communication by a user equipment (UE) is provided. The method generally includes determining frequency resources within one or more configured narrowband regions of a system bandwidth to monitor for a transmission and monitoring for the transmission on the determined frequency resources within the one or more narrowband regions of the system bandwidth.

11 Claims, 14 Drawing Sheets

(51) Int. Cl.
*H04W 4/70* (2018.01)
*H04L 5/00* (2006.01)
*H04B 1/713* (2011.01)
*H04W 24/08* (2009.01)

(52) U.S. Cl.
CPC ............. *H04L 5/0044* (2013.01); *H04W 4/70* (2018.02); *H04W 24/08* (2013.01); *H04W 72/042* (2013.01)

(56) References Cited

U.S. PATENT DOCUMENTS

| | | | |
|---|---|---|---|
| 2010/0240379 A1* | 9/2010 | Kishiyama | H04L 5/0053 455/450 |
| 2012/0163278 A1 | 6/2012 | Chang et al. | |
| 2013/0155868 A1* | 6/2013 | Seo | H03M 13/6525 370/241 |
| 2013/0322363 A1* | 12/2013 | Chen | H04L 5/001 370/329 |
| 2016/0112997 A1 | 4/2016 | Chen et al. | |
| 2016/0127936 A1* | 5/2016 | Chatterjee | H04W 4/70 370/252 |
| 2016/0219601 A1* | 7/2016 | Lin | H04L 5/0044 |
| 2016/0227582 A1 | 8/2016 | Vajapeyam et al. | |
| 2016/0338062 A1* | 11/2016 | Rico-Alvarino | H04B 1/713 |
| 2017/0134881 A1* | 5/2017 | Oh | H04W 56/001 |
| 2017/0164350 A1* | 6/2017 | Sun | H04L 5/0007 |
| 2019/0222405 A1* | 7/2019 | Wong | H04L 5/08 |

FOREIGN PATENT DOCUMENTS

| | | |
|---|---|---|
| CN | 104601316 A | 5/2015 |
| CN | 104811220 A | 7/2015 |
| CN | 105027651 A | 11/2015 |
| EP | 1804536 A3 | 5/2013 |
| WO | 2013040221 | 3/2013 |
| WO | 2013173673 A2 | 11/2013 |
| WO | 2016122193 A1 | 8/2016 |
| WO | WO-2017030345 A1 * | 2/2017 |

OTHER PUBLICATIONS

ZTE: "Discussion on Support of Larger PDSCH/PUSCH Bandwidth for MTC", R1-1609828, 3GPP TSG RAN WG1 Meeting #86bis, Lisbon, Portugal, Oct. 10-14, 2016, 6 Pages.

ZTE: "Support of Larger TBS and Larger PDSCH/PUSCH Bandwidth for MTC", 3GPP Draft, 3GPP TSG RAN WG1 Meeting #86, R1-167319 Support of Higher Bandwidth & TBS, 3rd Generation Partnership Project (3GPP), Mobile Competence Centre; 650, Route Des Lucioles; F-06921 Sophia-Antipolis Cedex; France, vol. Ran WG1, No. Gothenburg, Sweden; Aug. 22, 2016-Aug. 26, 2016, Aug. 21, 2016 (Aug. 21, 2016), 8 Pages, XP051125838, Retrieved from the Internet: URL: http://www.3gpp.org/ftp/Meetings_3GPP_SYNC/RAN1/Docs/ [retrieved on Aug. 21, 2016].

* cited by examiner

| RB0 | Part1 |
|---|---|
| RB1 | Part1 |
| RB2 | Part1 |
| RB3 | Part1 |
| RB4 | Part2 |
| RB5 | Part2 |
| RB6 | Part2 |
| RB7 | Part2 |

FIG. 16

| RB0 | Part1 |
|---|---|
| RB1 | Part2 |
| RB2 | Part1 |
| RB3 | Part2 |
| RB4 | Part1 |
| RB5 | Part2 |
| RB6 | Part1 |
| RB7 | Part2 |

FIG. 17

LARGER BANDWIDTHS AND HIGHER DATA RATES FOR EMTC

CROSS-REFERENCE TO RELATED APPLICATION & PRIORITY CLAIM

This application is a national stage application under 35 U.S.C. 371 of PCT/US2017/054515, filed Sep. 29, 2017, which claims benefit of and priority to Indian Patent Application No. 201641033513, filed Sep. 30, 2016, which are herein incorporated by reference in their entireties for all applicable purposes.

BACKGROUND

Field of the Disclosure

Aspects of the present disclosure relate generally to wireless communications systems, and more particularly, to larger bandwidths and higher data rates for enhanced machine type communications (eMTC).

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless multiple-access communication system may include a number of base stations, each simultaneously supporting communication for multiple communication devices, otherwise known as user equipment (UEs). In LTE or LTE-A network, a set of one or more base stations (BSs) may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a central unit, may define an access node (e.g., a new radio BS (NR BS), a NR NB, a network node, 5G NB, Next Generation NB (gNB), etc.). A BS or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in LTE and NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for larger bandwidths and higher data rates for enhanced machine type communications (eMTC).

Certain aspects of the present disclosure provide a method for wireless communication that may be performed, for example, by a user equipment (UE). The method generally includes determining frequency resources within one or more configured narrowband regions of a system bandwidth to monitor for a transmission. The method includes monitoring for the transmission on the determined frequency resources within the one or more narrowband regions of the system bandwidth.

Certain aspects of the present disclosure provide another method for wireless communication that may be performed, for example, by a base station (BS). The method generally includes allocating frequency resources, within one or more configured narrowband regions of a system bandwidth, for transmission. The method includes sending a transmission on the allocated frequency resources within the one or more narrowband regions of the system bandwidth.

Certain aspects of the present disclosure provide an apparatus for wireless communication, such as a UE. The apparatus generally includes means for determining frequency resources within one or more configured narrowband regions of a system bandwidth to monitor for a transmission. The apparatus includes means for monitoring for the transmission on the determined frequency resources within the one or more narrowband regions of the system bandwidth.

Certain aspects of the present disclosure provide another apparatus for wireless communication, such as a BS. The apparatus generally includes means for allocating frequency resources, within one or more configured narrowband regions of a system bandwidth, for transmission. The apparatus includes means for sending a transmission on the allocated frequency resources within the one or more narrowband regions of the system bandwidth.

Certain aspects of the present disclosure provide an apparatus for wireless communication, such as a UE. The apparatus generally includes at least one processor coupled with a memory. The at least one processor is configured to determine frequency resources within one or more configured narrowband regions of a system bandwidth to monitor for a transmission and monitor for the transmission on the determined frequency resources within the one or more narrowband regions of the system bandwidth.

Certain aspects of the present disclosure provide another apparatus for wireless communication, such as a BS. The apparatus generally includes at least one processor coupled with a memory. The at least one processor is configured to allocate frequency resources, within one or more configured narrowband regions of a system bandwidth, for transmission. The apparatus includes a transmitter configured to send a transmission on the allocated frequency resources within the one or more narrowband regions of the system bandwidth.

Certain aspects of the present disclosure provide a computer readable medium having computer executable code stored thereon for wireless communication. The computer executable code generally includes code for determining frequency resources within one or more configured narrowband regions of a system bandwidth to monitor for a transmission. The computer executable code includes code for monitoring for the transmission on the determined frequency resources within the one or more narrowband regions of the system bandwidth.

Certain aspects of the present disclosure provide a computer readable medium having computer executable code stored thereon for wireless communication. The computer executable code generally includes code for allocating frequency resources, within one or more configured narrowband regions of a system bandwidth, for transmission. The computer executable code includes code for sending a transmission on the allocated frequency resources within the one or more narrowband regions of the system bandwidth.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 16 is a resource diagram showing example frequency domain repetition, in accordance with certain aspects of the present disclosure.

FIG. 17 is another resource diagram showing example frequency domain repetition, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
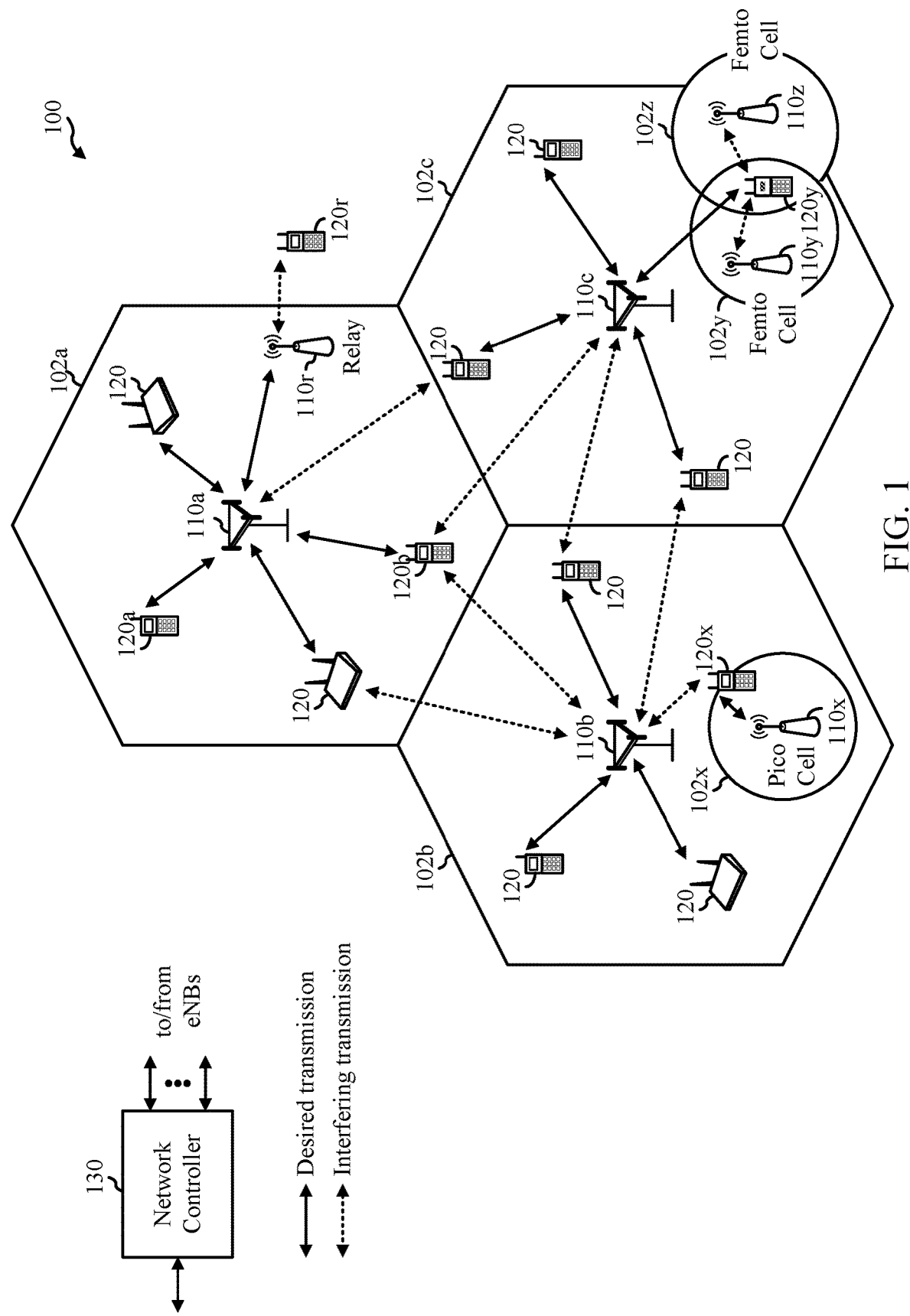
FIG. 1 is a block diagram conceptually illustrating an example wireless network, in accordance with certain aspects of the present disclosure.

Aspects of the present disclosure provide apparatus, methods, processing systems, and computer readable mediums for NR (new radio access technology or 5G technology). NR may support various wireless communication services, such as Enhanced mobile broadband (eMBB) targeting wide bandwidth (e.g. 80 MHz or beyond), millimeter wave (mmW) targeting high carrier frequency (e.g. 27 GHz or beyond), massive MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, (e.g., Release-13 long term evolution (LTE)), enhanced machine type communications (eMTC) are supported, targeting low cost devices, often at the cost of lower throughput. eMTC may involve half duplex (HD) operation in which uplink transmissions and downlink transmissions can both be performed—but not simultaneously. eMTC devices, such eMTC UEs may look at (e.g., be configured with or monitor) a maximum bandwidth of 1 MHz or 6 resource blocks (RBs) at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking and/or updates, etc., which may consist of infrequent transmissions of small amounts of data; however, greater throughput for eMTC devices may be desirable for other cases, such as certain Internet-of-Things (IoT) and/or narrowband IoT (NB-IoT) use cases, smart watches, etc.

Aspects of the present disclosure provide techniques and apparatus for allocating/monitoring higher bandwidths and higher data rates for eMTC. For example, aspects of the present disclosure provide for a 24 RB maximum bandwidth to the allocated/configured that the UE may monitor for transmissions, thereby enabling higher throughput from the BS.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. UE 120 may be configured for enhanced machine type communications (eMTC). The UE 120 may be considered a low cost device, low cost UE, eMTC device, and/or eMTC UE. The UE 120 can be configured to support higher bandwidth and/or data rates. For example, the UE 120 may be configured to monitor a larger bandwidth for transmissions (e.g., 24 resource blocks (RBs)). The UE 120 may determine frequency resources (e.g., RBs), for example, within a plurality of narrowband regions to monitor for the transmission (e.g., data or control transmission). The determination may be based on a resource allocation from a base station (BS) 110.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and Next Generation Node B (gNB), NB, 5G NB, access point (AP), NR BS, or transmission reception point (TRP) may be interchangeable. In some examples, a cell may not necessarily be stationary, and the geographic area of the cell may move according to the location of a mobile BS. In some examples, the base stations may be interconnected to one another and/or to one or more other BS or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR RBs may span 12 sub-carriers with a sub-carrier bandwidth of 75 kHz over a 0.1 ms duration. Each radio frame may consist of two half frames, each half frame including 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
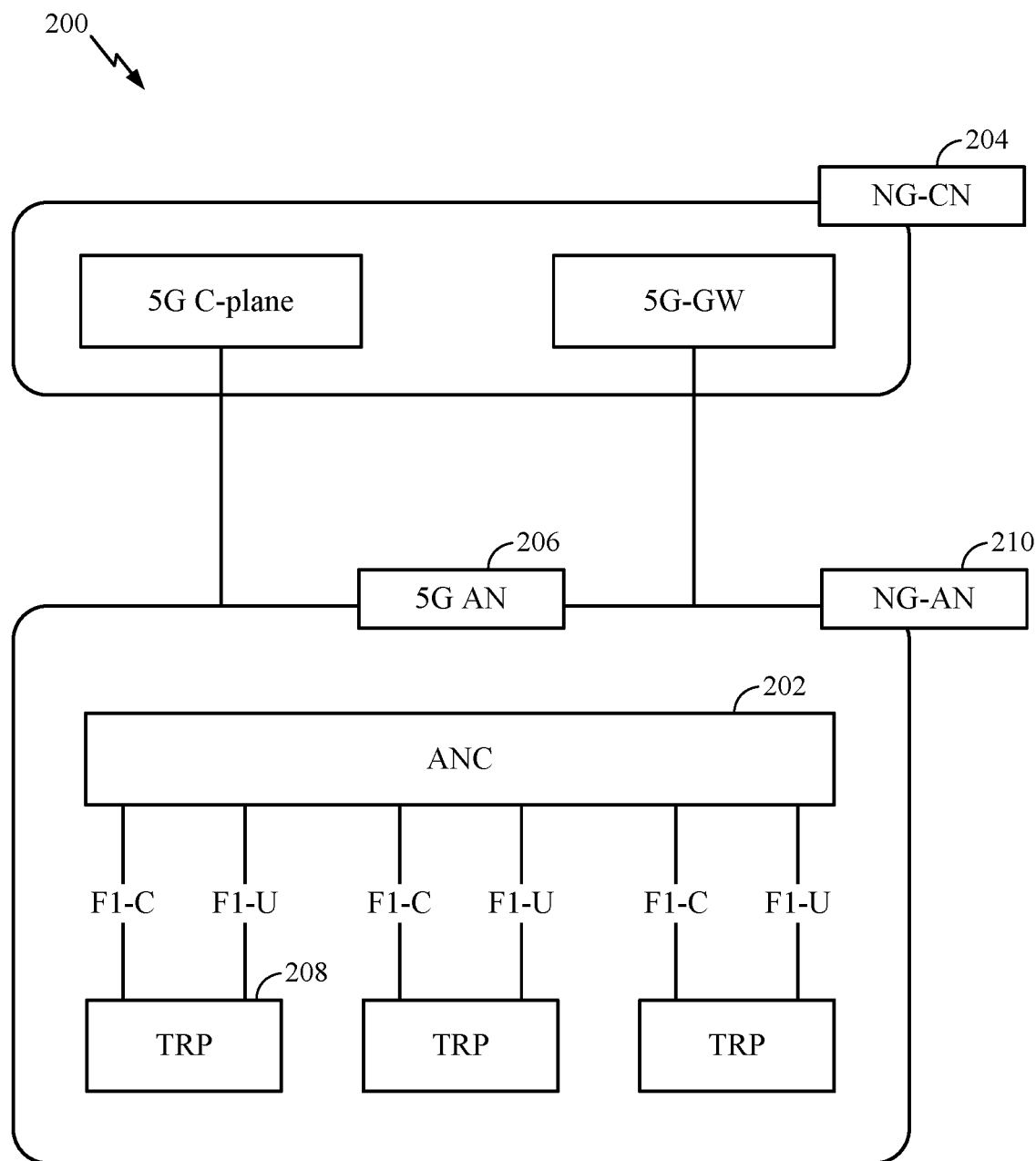
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC may include one or more TRPs 208 (which may also be referred to as BSs, gNBs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter).

The logical architecture may share features and/or components with LTE. The NG-AN 210 may support dual connectivity with NR. The NG-AN 210 may share a common fronthaul for LTE and NR.

The logical architecture may enable cooperation between and among TRPs 208. For example, cooperation may be preset within a TRP and/or across TRPs via the ANC 202. No inter-TRP interface may be needed/present.

The logical architecture may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more DUs (e.g., one or more TRPs 208).

Figure 3:
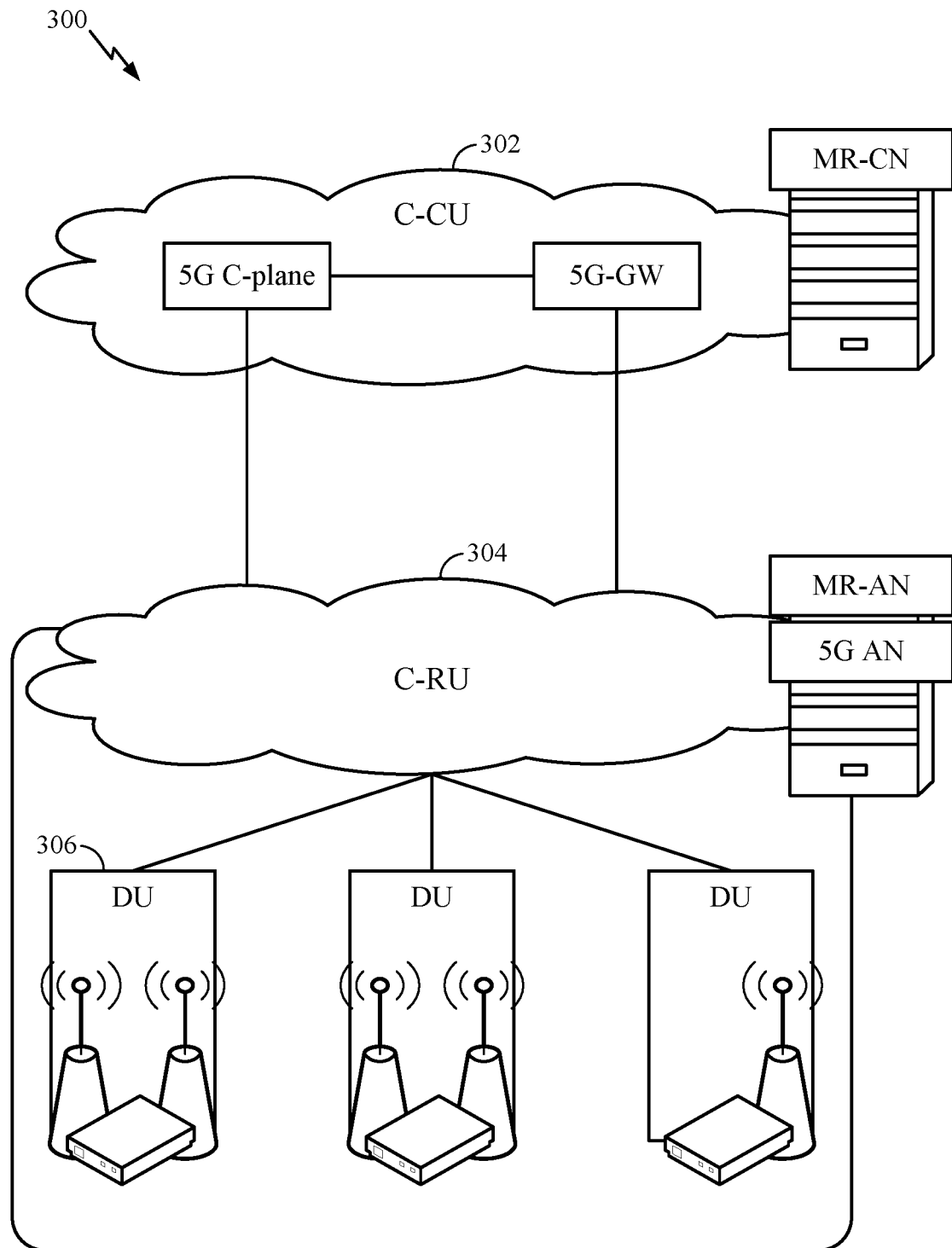
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU may have distributed deployment. The C-RU 304 may be closer to the network edge.

A DU 306 may host one or more TRPs (edge node (EN), an edge unit (EU), a radio head (RH), a smart radio head (SRH), or the like). The DU 306 may be located at edges of the network with radio frequency (RF) functionality.

Figure 4:
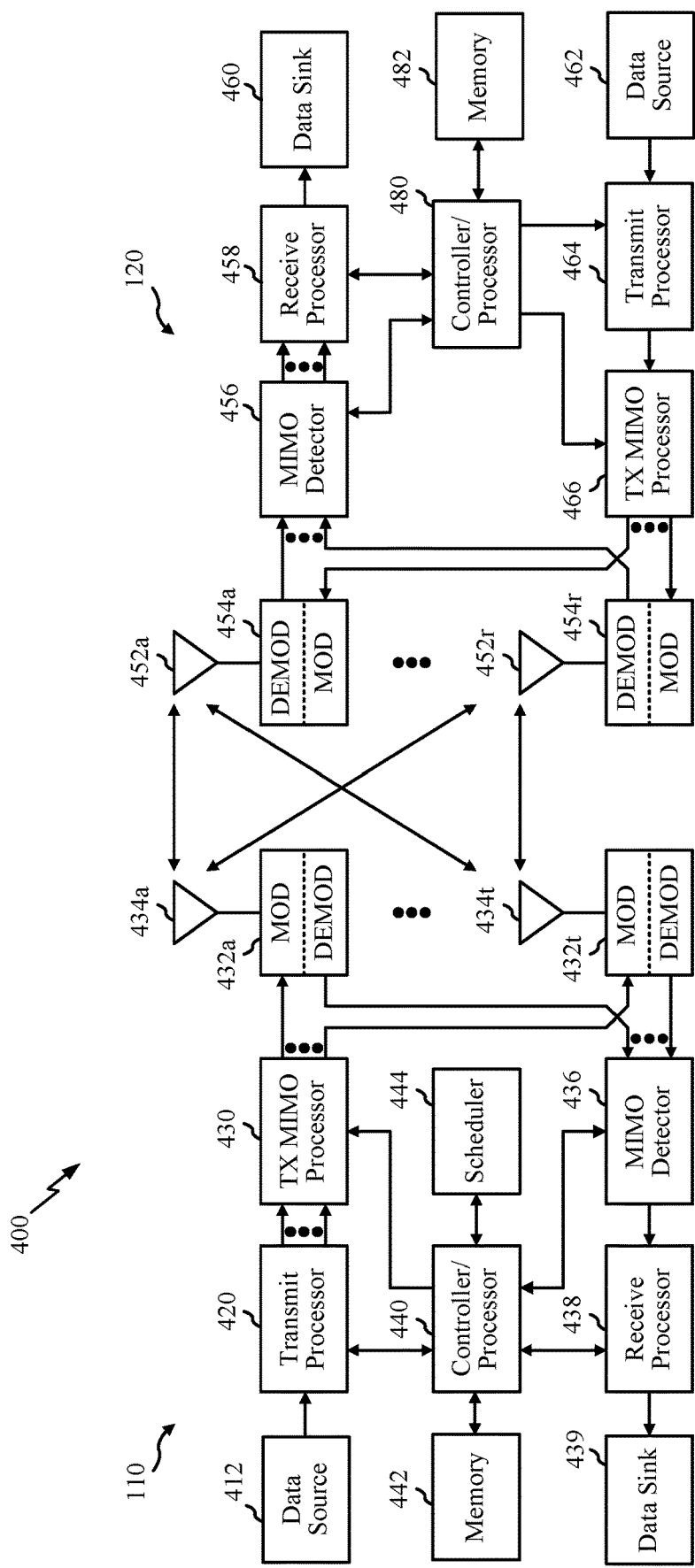
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-14.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), the secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, e.g., the execution of various processes for the techniques described herein. The processor 480 and/or other processors and modules at the UE 120 may also perform or direct, e.g., the execution of the functional blocks illustrated in FIGS. 9, and/or other processes for the techniques described herein. The processor 440 and/or other processors and modules at the BS 110 may also perform or direct, e.g., the execution of the functional blocks illustrated in FIG. 10, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
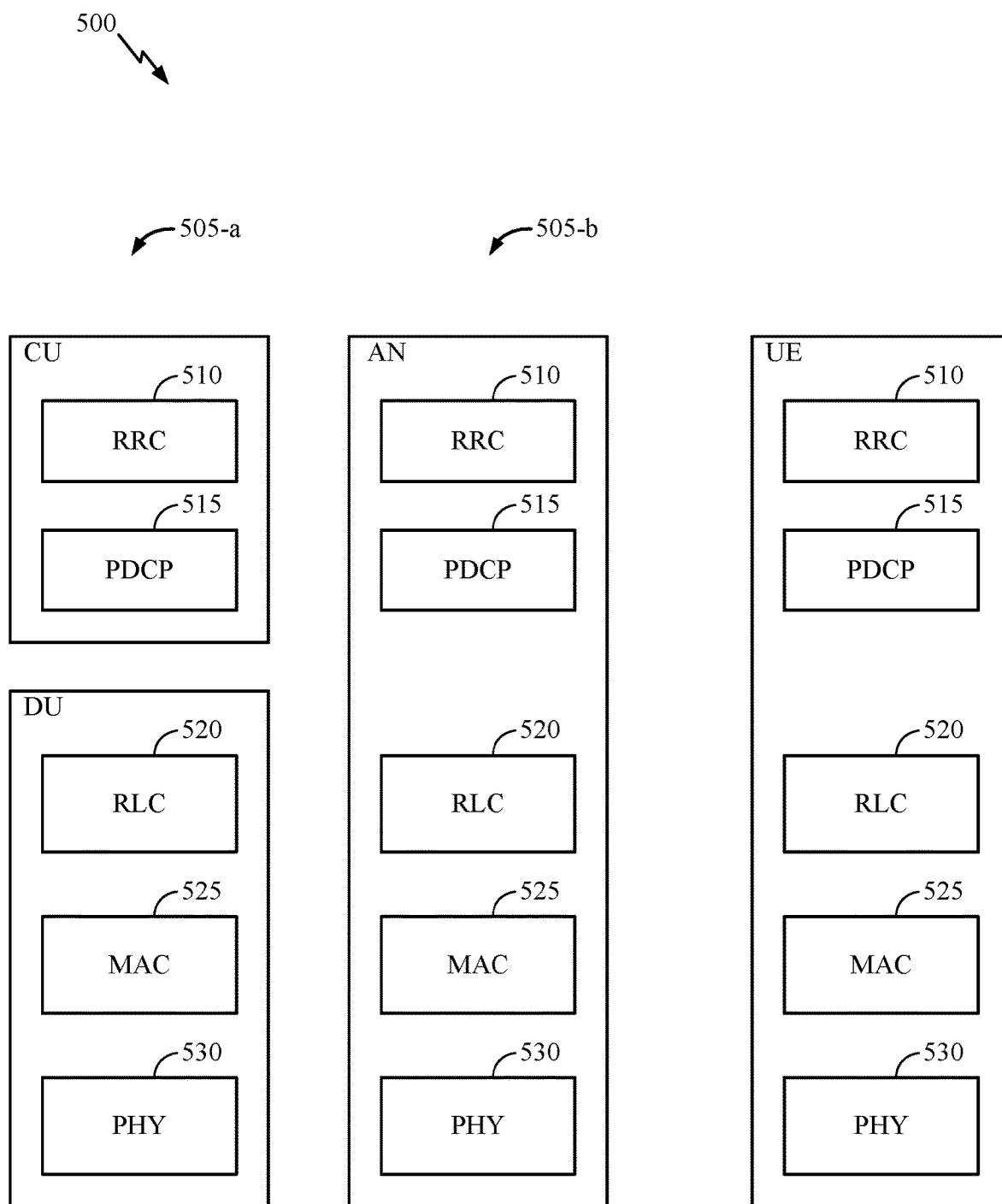
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), NR BS, a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
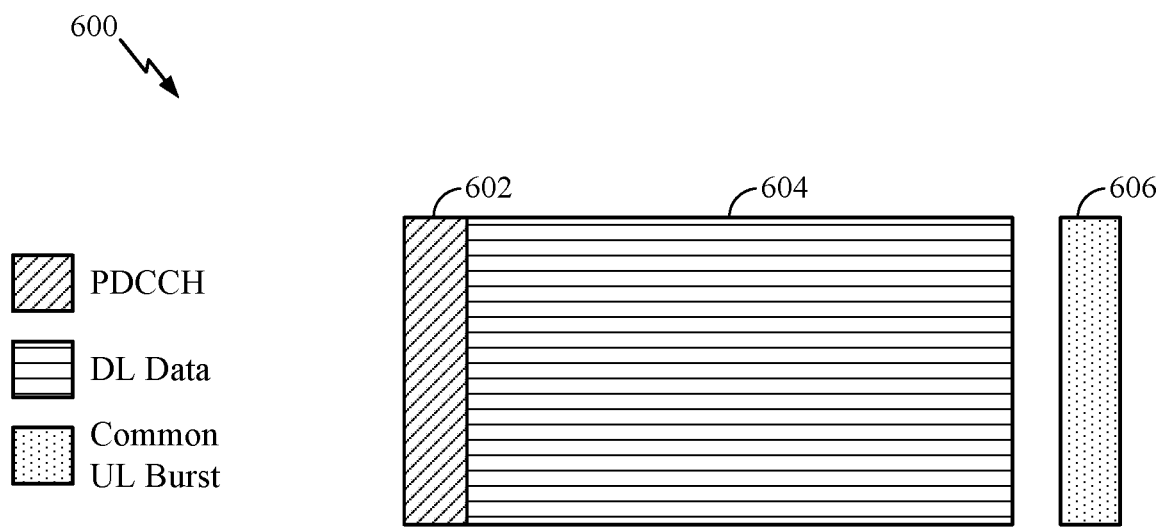
FIG. 6 illustrates an example of a downlink-centric subframe, in accordance with certain aspects of the present disclosure.

FIG. 6 is a diagram showing an example of a downlink-centric subframe. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe 600. In some configurations, the control portion 602 may be a physical DL control channel (PDCCH), as shown in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
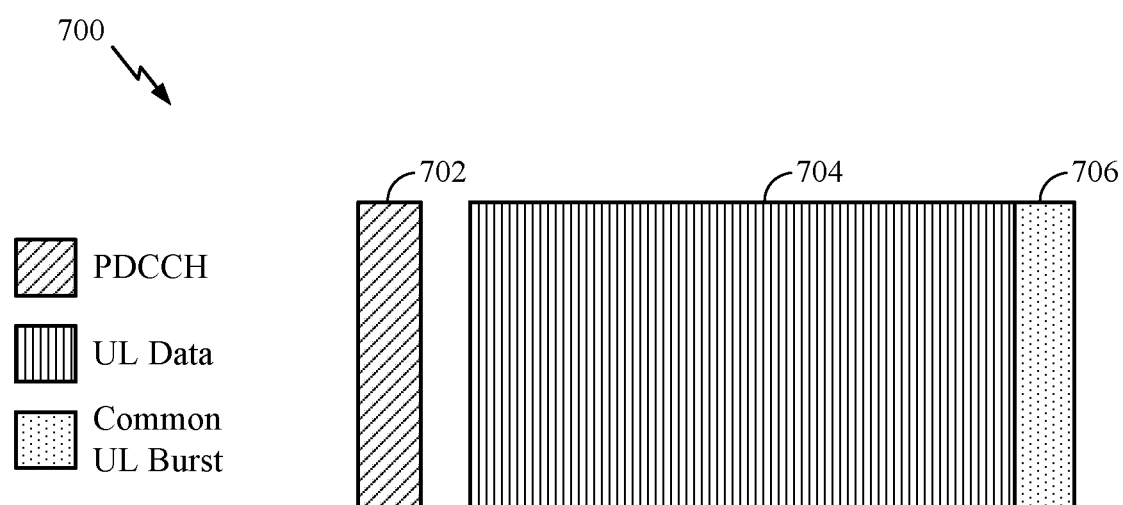
FIG. 7 illustrates an example of an uplink-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be aPDCCH.

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe 700 and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
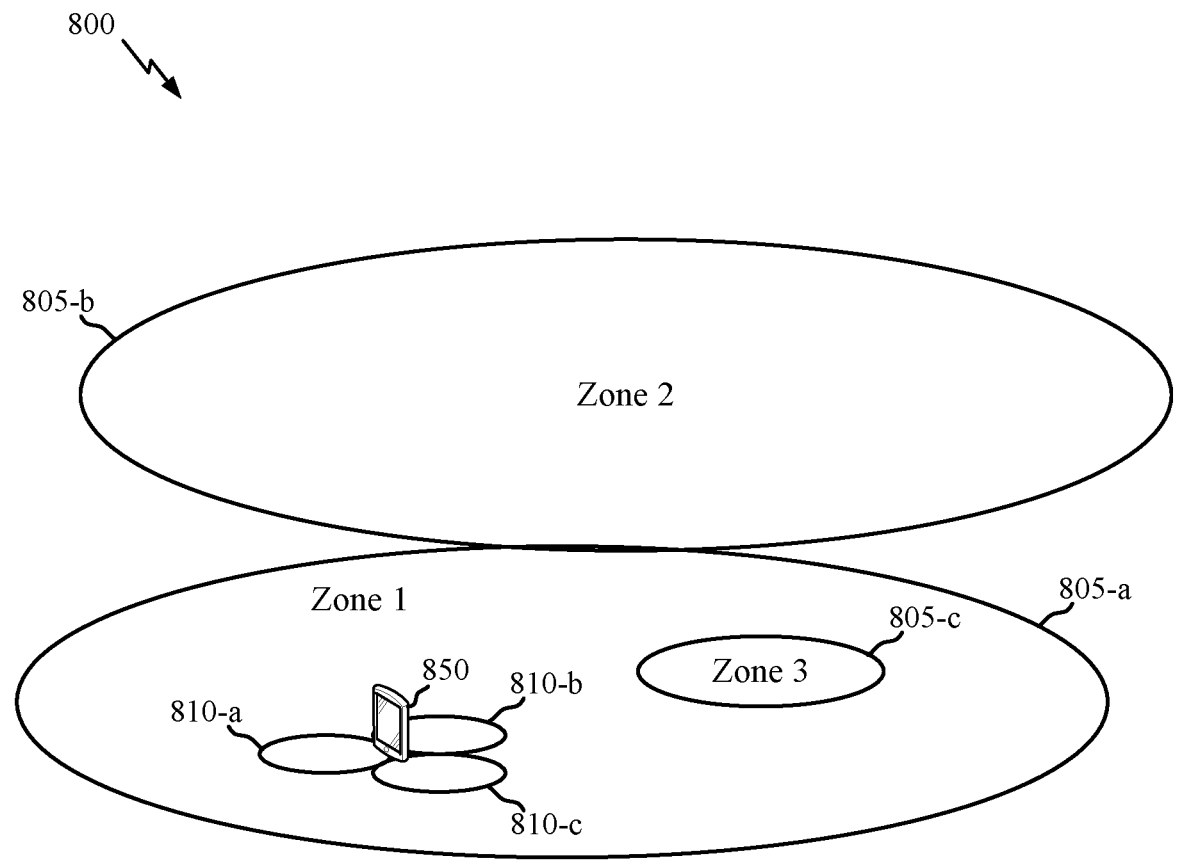
FIG. 8 illustrates an example of a wireless communication system supporting zones, in accordance with certain aspects of the present disclosure.

FIG. 8 illustrates an example of a wireless communication system 800 supporting a number of zones, in accordance with aspects of the present disclosure. The wireless communication system 800 may include a number of zones (including, e.g., a first zone 805-a (Zone 1), a second zone 805-b (Zone 2), and a third zone 805-c (Zone 3)). A number of UEs may move within or between the zones.

A zone may include multiple cells, and the cells within a zone may be synchronized (e.g., the cells may share the same timing). Wireless communication system 800 may include examples of both non-overlapping zones (e.g., the first zone 805-a and the second zone 805-b) and overlapping zones (e.g., the first zone 805-a and the third zone 805-c). In some examples, the first zone 805-a and the second zone 805-b may each include one or more macro cells, micro cells, or pico cells, and the third zone 1105-c may include one or more femto cells.

By way of example, the UE 850 is shown to be located in the first zone 805-a. If the UE 850 is operating with a radio resource configuration associated with transmitting pilot signals using a common set of resources, such as an RRC common state, the UE 850 may transmit a pilot signal using a common set of resources. Cells (e.g., ANs, DUs, etc.) within the first zone 805-a may monitor the common set of resources for a pilot signal from the UE 850. If the UE 850 is operating with a radio resource configuration associated with transmitting pilot signals using a dedicated set of resource, such as an RRC dedicated state, the UE 850 may transmit a pilot signal using a dedicated set of resources. Cells of a monitoring set of cells established for the UE 850 within the first zone 805-a (e.g., a first cell 810-a, a second cell 810-b, and a third cell 810-c) may monitor the dedicated set of resources for the pilot signal of the UE 850.

Example Higher Bandwidth And Data Rate For EMTC

In certain systems, (e.g., Release-13 long term evolution (LTE)) systems, enhanced machine type communications (eMTC) is supported. eMTC targets low cost devices, often at the cost of lower throughput. eMTC may employ half duplex (HD) operation in which uplink transmissions and downlink transmissions can both be performed, but not simultaneously (e.g., using time division duplexing (TDD)).

eMTC devices, such as eMTC user equipments (UEs) may look at (e.g., be configured with or monitor) a maximum bandwidth of (e.g., no more than) around 1 MHz (6 resource blocks (RBs)) at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking, and/or updates, etc., which may consist of infrequent transmissions of small amounts of data; however, greater throughput for eMTC devices may be desirable for other use cases, such as certain Internet-of-Things (IoT) or narrow-band IoT (NB-IoT) use cases, smart watches, etc.

In certain systems (e.g., Rel-13 LTE systems), measurement gaps are configured. A measurement gap may interrupt transmissions in a greater number of subframes (e.g., a 6 ms gap) than just the duration of the configured measurement gap. For example, for a measurement gap beginning at subframe n, allocations from subframes n–4 may be useless (e.g., ignored), since there would not be time for the grant, transmission, and ACK/NACK information to occur before the measurement gap. These useless (e.g., unused/interrupted/ignored) subframes may reduce throughput. For eMTC, the number of useless subframes may be even greater. For example, n–6 subframes may be useless due to the scheduling delay between the MTC physical downlink control channel (MPDCCH) and physical downlink shared channel (PDSCH). If repetition is used for those channels, the interruption may be even longer.

In some cases, the interruption due to the measurement gap can be reduced by using larger measurement periodicities (e.g., such as a 240 ms periodicity); however, this approach may impact mobility, since the UE does not perform measurements as frequently. In some cases, the interrupted subframes can be treated as invalid downlink and/or uplink subframes, for example, using an invalid subframe bitmap.

Example Larger Bandwidth Allocation

Aspects of the present disclosure provide techniques and apparatus for higher bandwidths to be allocated/monitored and higher data rates for eMTC. For example, UEs may support a 24 RB bandwidth. Thus, the UE can monitor for transmission within a 24 RB bandwidth of the wider system bandwidth. Aspects herein provide various configurations of the higher 24 RB bandwidth, frequency hopping patterns, signaling for indicating the resource allocation of the higher bandwidth, signaling for indicating support of higher bandwidth, etc.

Figure 9:
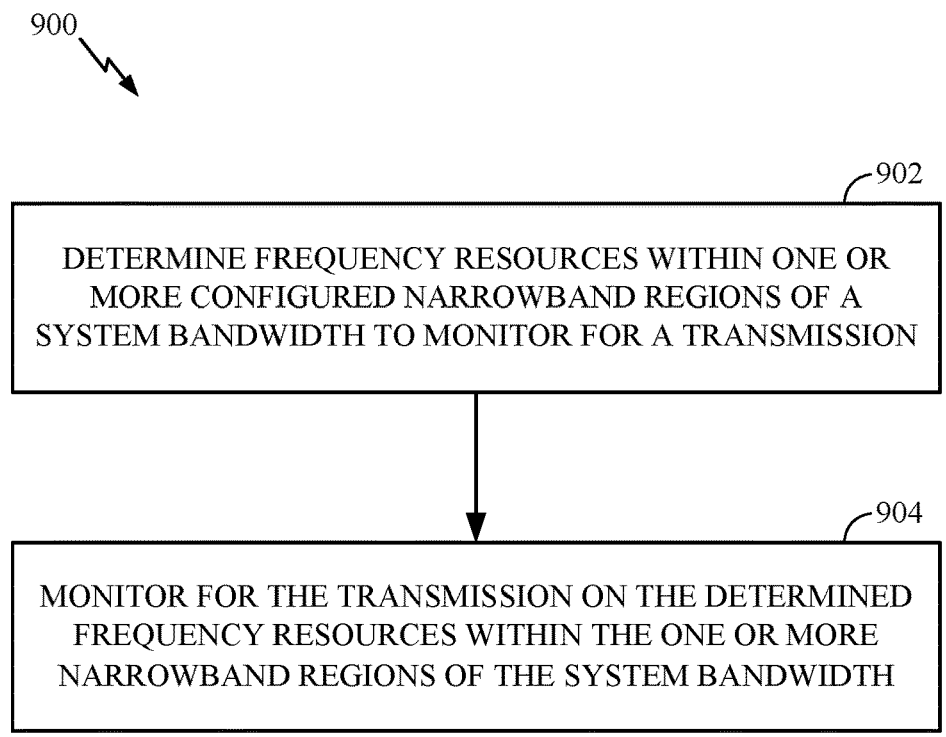
FIG. 9 is a flow diagram illustrating example operations that may be performed by a UE, for determining wider bandwidth frequency resources to monitor for a transmission, in accordance with certain aspects of the present disclosure.

FIG. 9 is a flow diagram illustrating example operations 900 that may be performed, for example, by a UE (e.g., UE 120 which may be a low cost/eMTC UE), for determining frequency resources within narrowband regions to monitor for a transmission, in accordance with certain aspects of the present disclosure.

Operations 900 may begin, at 902, by determining frequency resources within one or more configured narrowband regions of a system bandwidth to monitor for a transmission. At 904, the UE monitors for the transmission on the determined frequency resources within the one or more narrowband regions of the system bandwidth.

Figure 10:
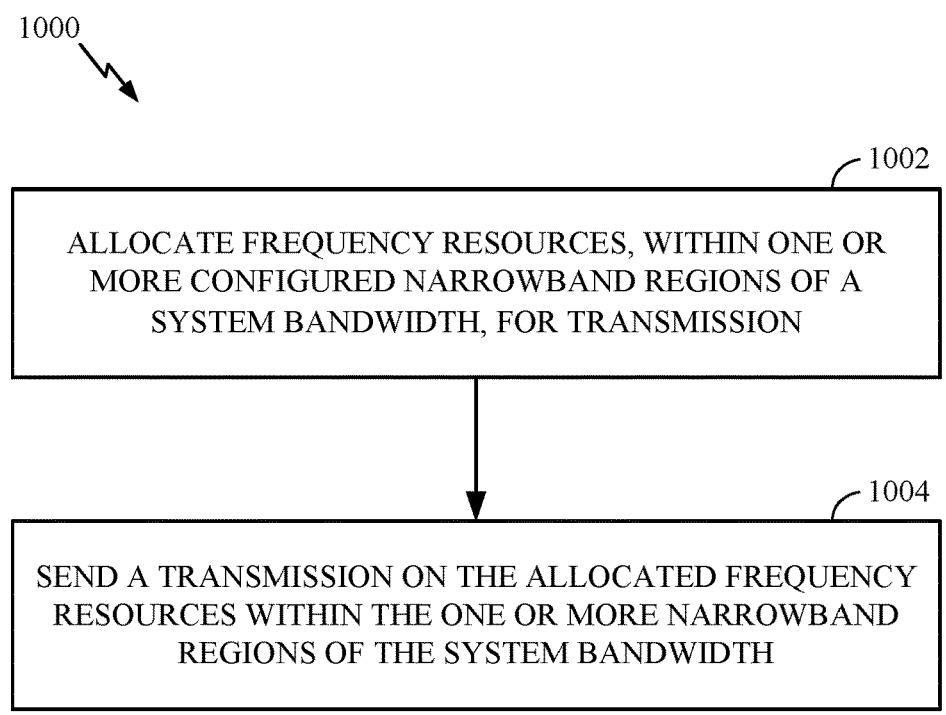
FIG. 10 is a flow diagram illustrating example operations that may be performed by a BS, for allocating wider bandwidth frequency resources for transmission, in accordance with certain aspects of the present disclosure.

FIG. 10 is a flow diagram illustrating example operations 1000 that may be performed, for example, by a BS (e.g., BS 110), for allocating frequency resources within a narrowband region, in accordance with certain aspects of the present disclosure. Operations 1000 may be complementary operations by the BS to the operations 900 by the UE.

Operations 1000 may begin, at 1002, by allocating frequency resources, within one or more configured narrowband regions of a system bandwidth, for transmission. At 1004, the BS sends a transmission on the allocated frequency resources within the one or more narrowband regions of the system bandwidth.

According, to certain aspects, support for monitoring larger bandwidth may be reported as part of the UE capability. In aspects, the support/indication may be statically configured, semi-statically configured, or determined/indicated dynamically based on desired throughput and/or power level for the UE. In some cases, the UE may reconnect to a cell with a different capability. In some cases, the UE may request the larger bandwidth, for example, via a scheduling request (SR). In addition or alternatively, the network may determine to configure the UE for the larger bandwidth, for example, based on a desired throughput.

Example Larger Bandwidth Allocation for Data Transmission

According to certain aspects, the UE may be configured with a larger bandwidth (e.g., larger than the legacy 1 MHz). For example, the UE can be configured to support a maximum bandwidth of 24 resource blocks (RBs) (e.g., 5 MHz) that the UE can monitor for a transmission. The 24 RBs may correspond to 4 narrowband regions (each narrowband region consisting of a fixed number of 6 contiguous RBs). In this case, the BS may be able to allocate resources for transmissions, for example data transmissions (e.g., physical downlink shared channel (PDSCH)) or control transmissions (e.g., MTC physical downlink control channel (MPDCCH)), within the 24 RBs. The BS may allocate the resources using frequency hopping (e.g., for repetitions of transmissions). Although a maximum bandwidth of 24 RBs is discussed herein, other sizes of bandwidth can be used (e.g., other multiples of 6 RBs).

Figure 11:
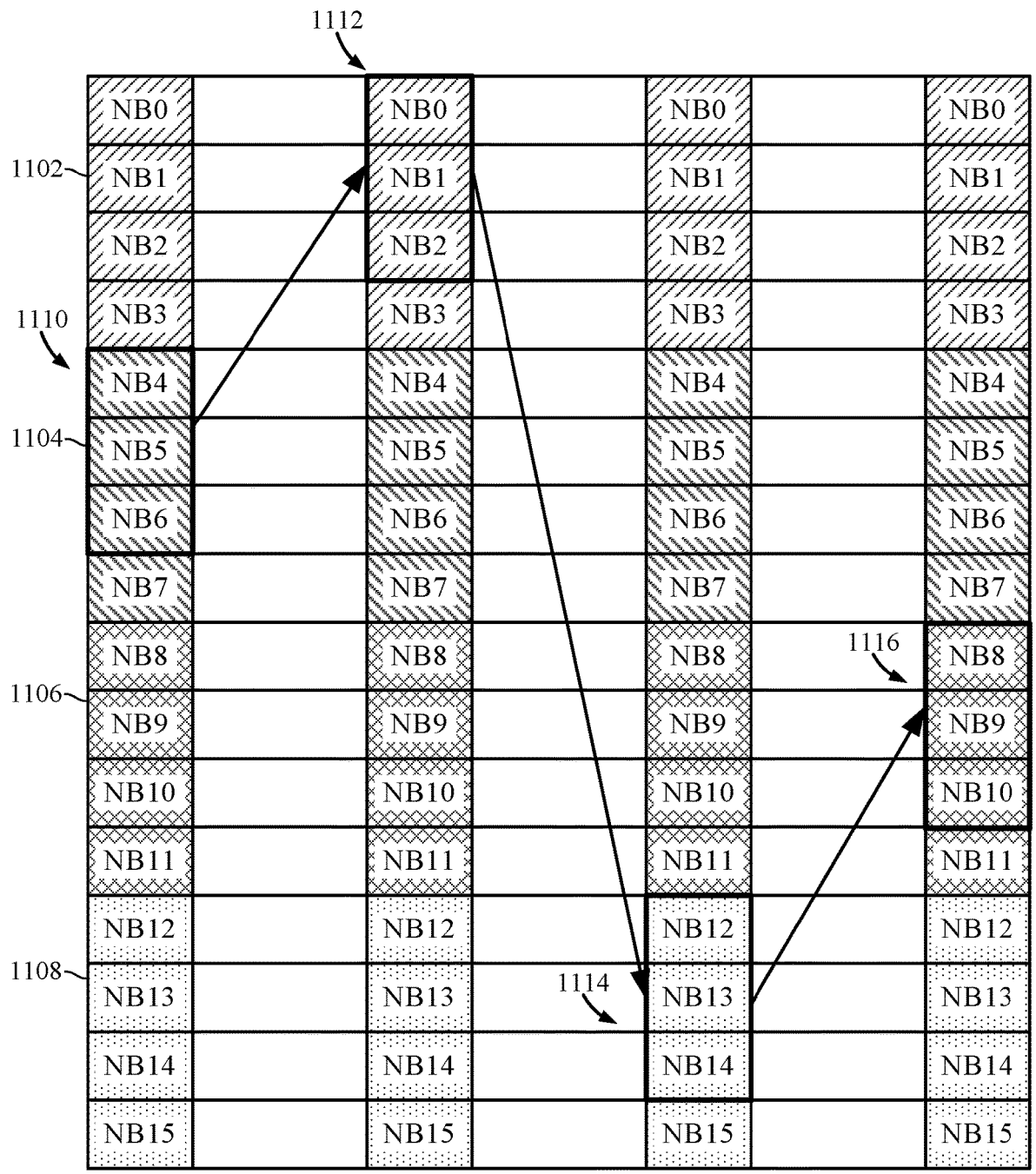
FIG. 11 is a resource diagram showing example data allocations within blocks of narrowband regions with frequency hopping, in accordance with certain aspects of the present disclosure.

FIG. 11 illustrates one example of frequency hopping for allocating PDSCH transmissions. According to certain aspects, as shown in FIG. 11, allocations may be performed between blocks of narrowband regions (e.g., blocks 1102, 1104, 1106, 1108). As shown in FIG. 11, each block 1102, 1104, 1106, and 1108 includes 4 narrowband regions (e.g., block 1102 includes NB regions 0-3; block 1104 includes NB regions 4-7; block 1106 include NB regions 8-11; and the block 1108 includes NB regions 12-15). Although not shown in FIG. 11, each block 1102, 1104, 1106, 1108 may correspond to 6 contiguous RBs and, thus, each block of NB regions corresponds to 24 RBs. As shown in FIG. 11, each allocation is limited to NB regions within a block and frequency hopping is performed between blocks. Thus, in the example shown in FIG. 11: a first PDSCH 1110 is allocated NB regions 4-6 within the block 1104; a second PDSCH 1112 is allocated NB regions 0-2 within the block 1102; a third PDSCH 1114 is allocated NB regions 12-14 within the block 1108; and a fourth PDSCH 1116 is allocated NB regions 8-10 within the block 1106.

The BS may send a resource allocation to the UE indicating the RBs of the system bandwidth for the UE to monitor for a transmission. The allocations may be indicated using a NB region bitmap indicating narrowband regions within the block of narrowband regions, and RBs within each of the NB regions. In some cases, the RBs can be the same across NB regions. As an example, 2 bits can be used to indicate the block (e.g., block 1102, 1104, 1106, 1108), 4 bits can be used to indicate the NB regions (e.g., which of the four NB regions, NB0-NB12, within the indicated block), and 5 bits can be used to indicate the RBs within the indicated NB regions (e.g., which of the 6 RBs within each NB region). Alternatively, a starting RB and/or ending RB (or legacy type) may be indicated along with an index number of the block of narrowbands.

Figure 12:
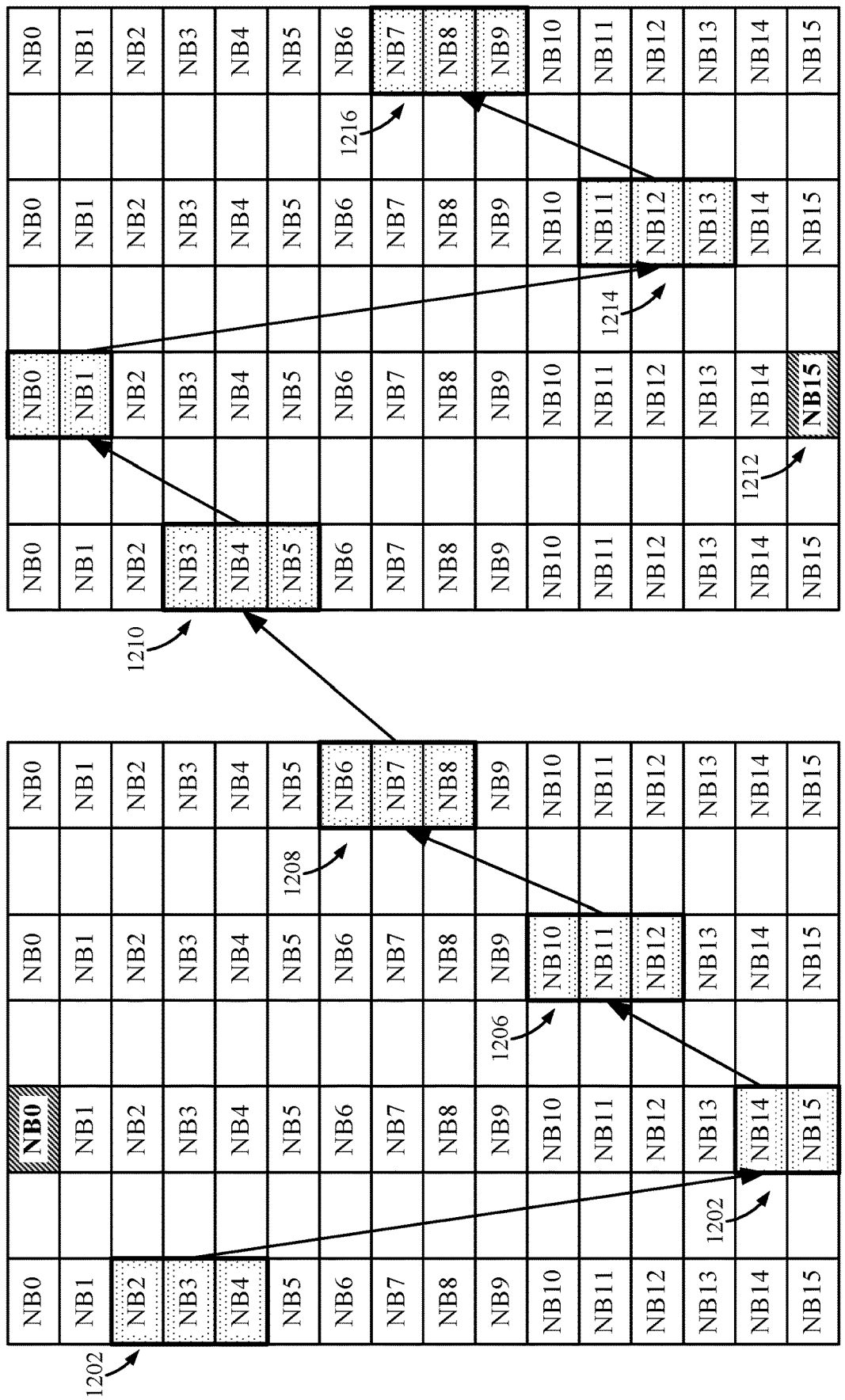
FIG. 12 is another resource diagram showing example data allocations within blocks of narrowband regions with frequency hopping, in accordance with certain aspects of the present disclosure.

Alternatively, rather than allocating NB regions within one of the blocks 1102, 1104, 1106, 1108, any 24 contiguous RBs of the system bandwidth can be allocated for transmission. The allocation may indicate a starting narrowband region (but not a starting RB). For example, 4 bits in downlink control information (DCI) can be used to indicate the starting NB region. As shown in FIG. 12, a first PDSCH 1202 can be allocated NB regions 2-4 (which would not be in the same block of narrowband regions shown in FIG. 11) and subsequent PDSCH allocations 1204-1216 are frequency hopped to any other narrowband region in the system bandwidth.

As shown in FIG. 12, since the allocation can be to any starting NB region and is not limited to within a block of NB regions, in some cases there may be allocations wrapping around the system bandwidth when the frequency is hopped to the edge of the system bandwidth. For example, as shown in FIG. 12, the PDSCH 1204 is allocated NB regions 14, 15, and 0 and the PDSCH 1212 is allocated NB regions 15, 0, and 1. According to certain aspects, for allocations that wrap around the system bandwidth, the larger portion of the allocation may be selected (e.g., NB regions 14 and 15 for PDSCH 1204 and NB regions 0 and 1 for PDSCH 1212). The remaining portion (e.g., NB region 0 for PDSCH 1204 and NB region 15 for PDSCH 1214) can be assumed punctured.

The allocations may be indicated using a start NB region index and a bitmap of length equal to one less than the number of NB regions. The NB regions that are allocated will include the start NB as the first NB region, and then the subset of NB regions (from the NB regions after the NB region) indicated by the bitmap. As an example, for 24 RBs (i.e., 4 NB regions support) in a 20 MHz system, the start NB can be 6, and the bitmap can be 011, which means the NB regions 6, 8 and 9 are allocated for the PDSCH. This may provide an efficient usage of the bits to indicate the allocations. Any allocation of $N_{NB}^{UE}$ or less NB regions may be indicated using the first allocated narrowband region may within 0 to $N_{NB}^{Sys}-N_{NB}^{UE}$, wherein $N_{NB}^{Sys}$ is the number of narrowband regions in the system bandwidth. The remaining $N_{NB}^{UE}-1$ locations after the first allocation narrowband regions may be arbitrarily allocated. Thus, the number of possible allocations may be given by $(N_{NB}^{Sys}-N_{NB}^{UE}+1) \times 2^{N_{NB}^{UE}-1}$. Alternatively, the first allocation narrowband region may be within $N_{NB}^{Sys}-N_{NB}^{UE}+1$ to $N_{NB}^{Sys}-1$. In this case, the allocation may be less than or equal to $N_{NB}^{UE}-1$ NBs, with an arbitrary subset of the last $(N_{NB}^{UE}-1)$ NB regions allocated. This is possible in $2^{N_{NB}^{UE}-1}-1$ ways. So, the overall number of possibilities is $(N_{NB}^{Sys}-N_{NB}^{UE}+1) \times 2^{N_{NB}^{UE}-1}+2^{N_{NB}^{UE}-1}-1=(N_{NB}^{Sys}-N_{NB}^{UE}+2) \times 2^{N_{NB}^{UE}-1}-1$. These overall number of possibilities can be represented using K bits, where $K=\log_2 N_{NB}^{Sys}+N_{NB}^{UE}-1$. The first part of K indicates the start NB region, and the later part of the K indicates the bitmap. This approach can be used for other bandwidth combinations as well. For a UE configured for monitoring 5 MHz in a 5 MHz system bandwidth, the starting narrowband region in existing DCI payload may be replaced with the 4-bit bitmap for each of 4 configured NB regions. For a UE configured for monitoring 5 MHz in a 10 MHz, 15 MHz, and/or 20 MHz bandwidth, the starting NB regions can be indicated along with a 3-bit bitmap. The set of allocated NB regions can be indicated by a starting NB region index values as the first allocated NB region. The NB regions from the starting NB region index+1 to the starting NB region index+3 are used as per the 3-bit bitmap.

Alternatively, type 0, type 1, and/or type 2 resource allocation based procedures from LTE may be used to determine/indicate the NB allocation, which can also be considered to reduce the payload. For example, existing RIV based type 2 resource allocation indication can be reused to indicate the allocated RBs within a NB region.

Example Larger Bandwidth Allocation for Control Transmission

Figure 13:
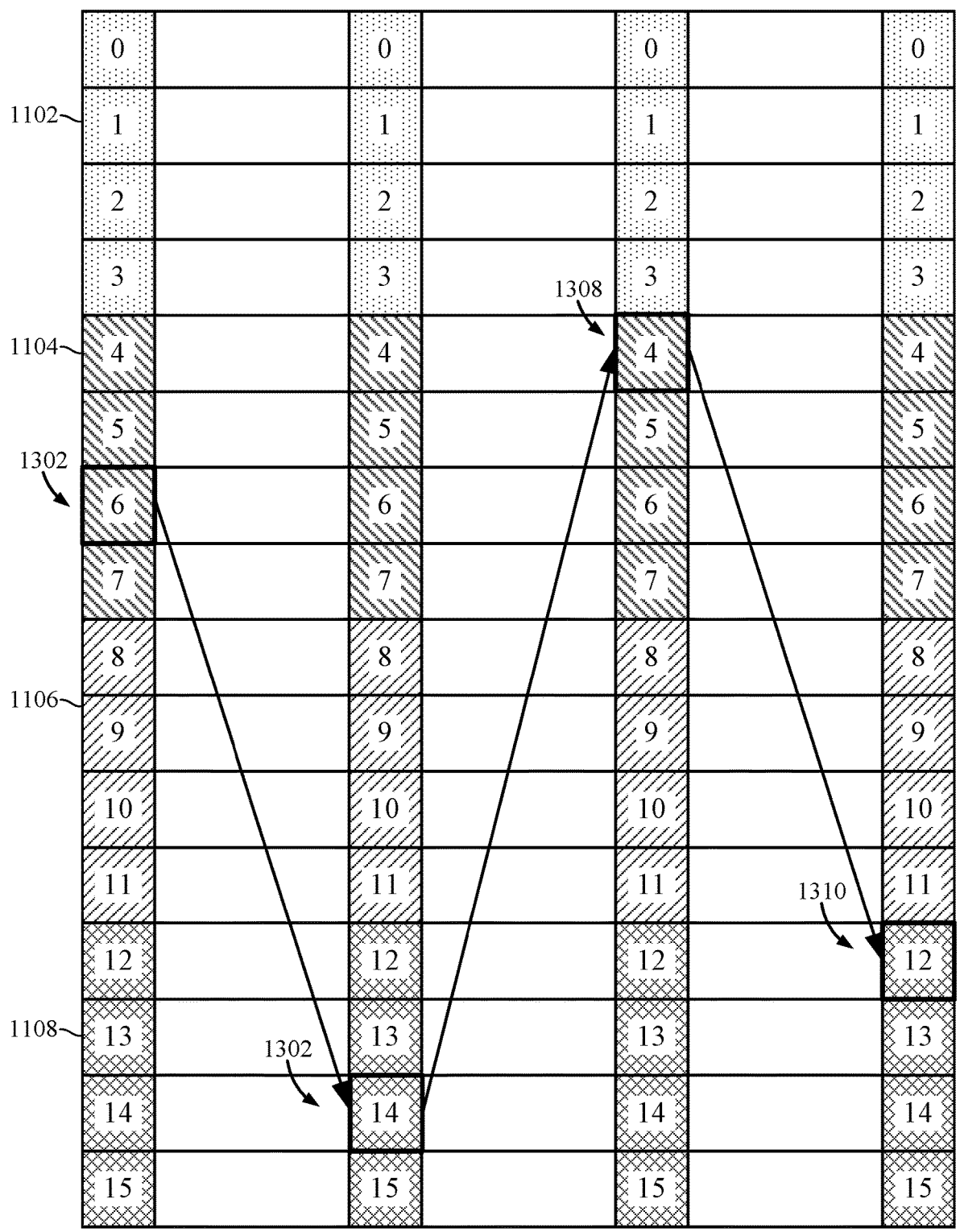
FIG. 13 is a resource diagram showing example control allocations within blocks of narrowband regions with frequency hopping, in accordance with certain aspects of the present disclosure.

According to certain aspects, for the UEs configured to support monitoring larger bandwidth (e.g., such as 24 RBs), control signaling (e.g., MPDCCH) for the UE may be allocated a smaller bandwidth. For example, the control region may be 6 RBs (i.e., 1 NB region). The 6 RBs for the control signaling may be contiguous RBs. The control signaling may be allocated at a NB region granularity. The control signaling may be frequency hopped across the larger bandwidth. As shown in FIG. 13, MPDCCH 1302 is allocated a single NB region, NB region 6 in block 1104.

Figure 14:
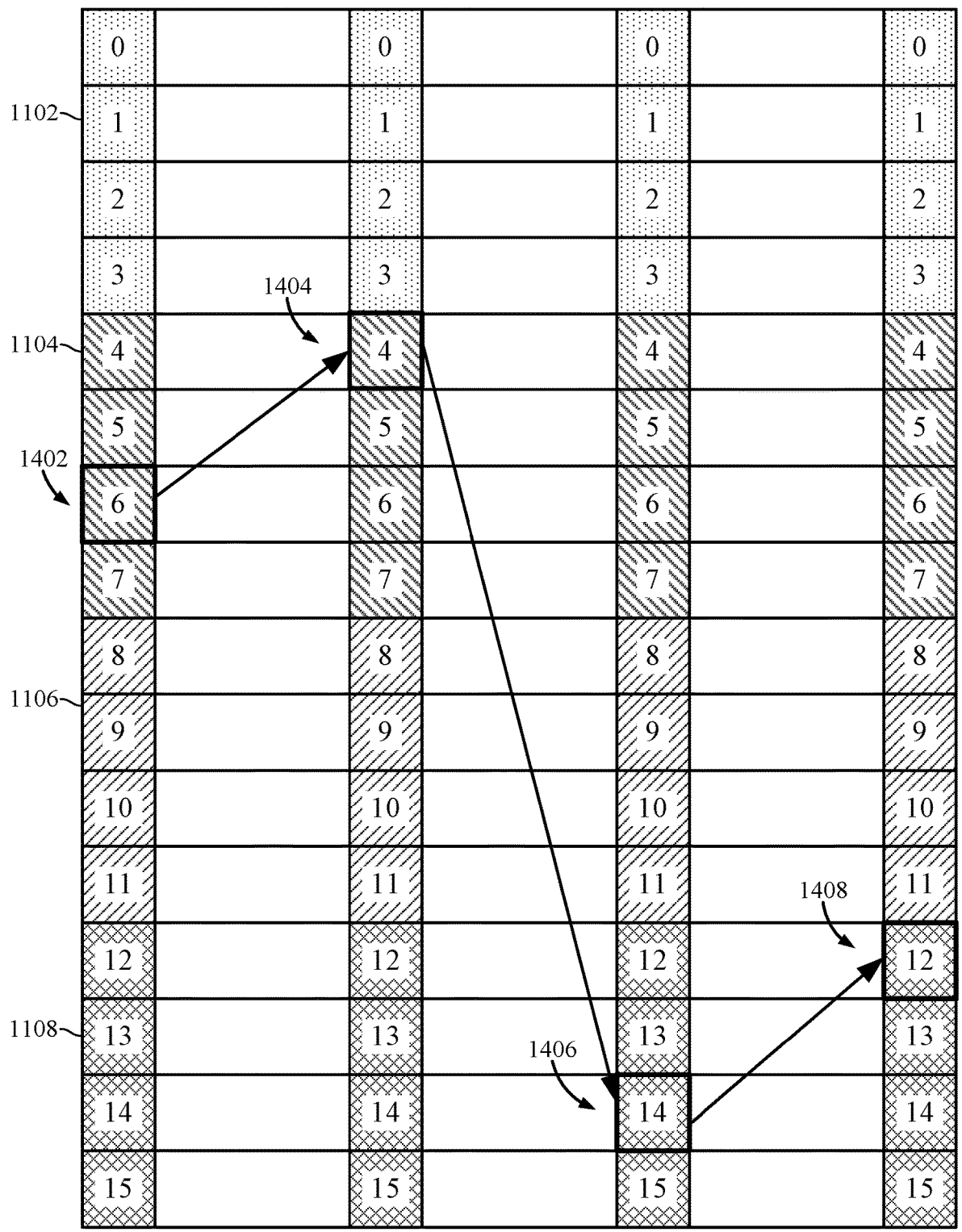
FIG. 14 is another resource diagram showing example control allocations within blocks of narrowband regions with frequency hopping, in accordance with certain aspects of the present disclosure.

According to certain aspects, the control signaling may hop between all of the blocks of narrowband regions (e.g., 96 RBs). According to certain aspects, the hopping may be within a same block, between different blocks, or a combination. For example, as shown in FIG. 13, MPDCCH 1302 may be frequency hopped to NB region 14 in a different block 1108, MB region 8 in block 1104, then NB region 12 in block 1108. In some cases, the hopping to a different block may be in units of four narrowband regions. As shown in FIG. 14, MPDCCH 1402 hops between NB regions within a block and also hops to different block and different NB regions within that block. For example, the MPDCCH 1402 hops from NB region 6 to NB region 4 within the same block 1104 and also hops to a different block 1108 and hops between NB region 14 and NB region 12 within that block 1108.

According to certain aspects, MPDCCH may be demodulated using broadcast cell-specific reference signal (CRS). For the same code rate, the performance of MPDCCH may be poorer than the performance of PDSCH in transmission mode (TM) 2. According to certain aspects, the network may switch between CRS and dedicated UE-RS based MPDCCH based on transmission mode, network preference, or other criteria.

Example Uplink Assignment Index

A gap subframe may be used when switching from downlink to uplink or uplink to downlink. In certain systems, an uplink grant provided in subframe n schedules an uplink transmission in subframe n+4. Due to timing constraints, the number of possible uplink subframes for data can be limited.

Figure 15:
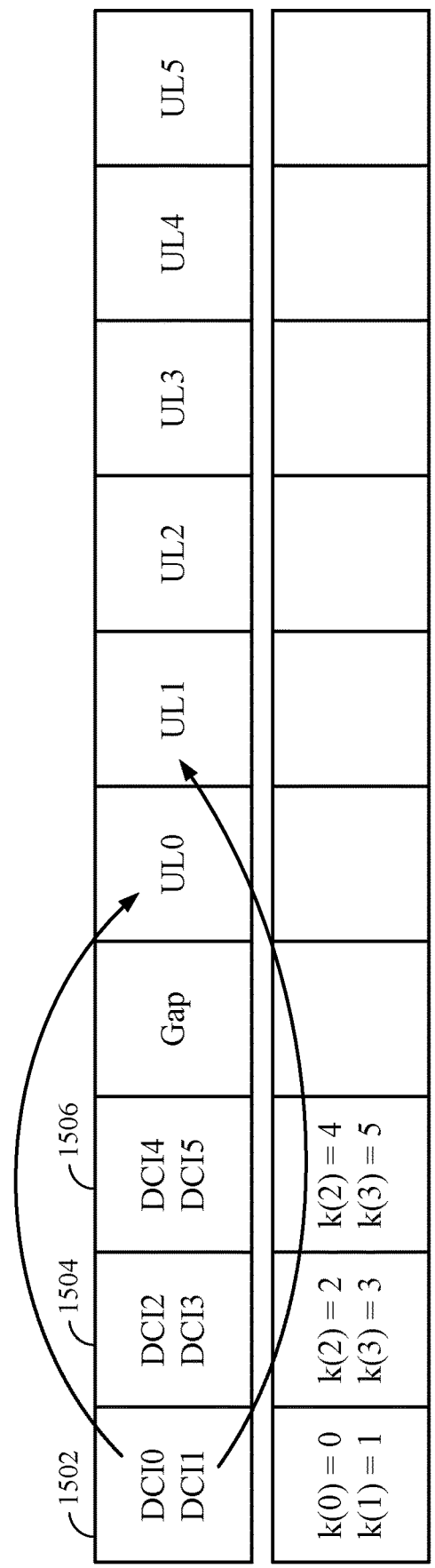
FIG. 15 illustrates example scheduling using an uplink assignment index, in accordance with certain aspects of the present disclosure.

According to certain aspects, multiple uplink grants from MPDCCHs may be included within the same downlink subframe. The uplink grant may also include an uplink assignment index (UAI), k (e.g., a positive integer value), indicating an offset from the default subframe (e.g., n+4) for the scheduled transmission. Thus, the uplink grant received in subframe n schedules a transmission for subframe n+4+k. The uplink assignment index may take values from $\{0, 1, \ldots B-1\}$. In some cases B may equal 4 or 6. FIG. 15 illustrates an example in which B is equal to 6. As shown in FIG. 15, two uplink grants are provided in DCI 0 and 1, DCI 2 and 3, and DCI 4 and 5, in each of the first three downlink subframes 1502 (e.g., subframe 0 in a frame), 1504 (e.g., subframe 1), and 1506 (e.g., subframe 2), respectively. The uplink grants in subframe 1502 include a UAI (k) value of 0 and 1, scheduling transmission in subframe 4 (0+4+0) and subframe 5 (0+4+1), respectively.

Alternatively, values of B smaller than 4 may be used. In this case, the uplink grants from previous subframes may be checked. In the case of DCI failures, this may result in uplink grant loss.

Example Channel State Feedback

According to certain aspects, the UE may provide channel state feedback (CSF) for the larger maximum bandwidth (e.g., 24 RBs). In some cases, the UE may provide channel quality information (CQI) as an average of all the narrowband regions for which the UE is configured to monitor. For example, even if the UE is monitoring a single narrowband region (e.g., 6 RBs), the UE may report CQI as an average for the entire four narrowband regions (e.g., 5 MHz block). In this case, if $NB_{k1}$, $NB_{k2}$, $NB_{k3}$ $NB_{k4}$ are configured for MPDCCH (with hopping), then the CQI is computed as average CQI as seen over set of 5 MHz blocks given by $\{B_5(NB_{k1}), B_5(NB_{k4}), B_5(NB_{k3}), B_5(NB_{k4})\}$. Alternatively, the UE may compute the CQI over only the narrowband regions that the UE has been monitoring.

In another alternative, in the case that the UE operates in the smaller bandwidth (e.g., 6 RBs), for example, for control signaling, the UE may still report CQI for the larger bandwidth. For example, the UE may measure periodically on the larger bandwidth.

According to certain aspects, the UE may also report the best NB region and the corresponding CQI. For example, the UE may report the best five narrowband regions.

According to certain aspects, the UE may provide precoding matrix information (PMI) feedback per-narrowband region. Alternatively, the UE may provide a single PMI for multiple narrowband regions.

Example Frequency Domain Repetition

In some scenarios (e.g., voice over LTE (VoLTE)), increased coverage may be limited by the repetition levels that can be supported. With larger configured maximum bandwidth, the UE may be able to perform frequency domain repetition and, thus, achieve better coverage. For frequency flat channels, repetition may not be any better than power boosting. For frequency selective channels, better frequency diversity may be achieved.

According to certain aspects, repetition may be performed on a RB basis. For example, as shown in FIG. 16, a first portion (i.e., Part1) of a transmission (e.g., a transport block) may be repeated in a first N RBs (e.g., RB0-RB3) and a second portion of the transmission (i.e., Part2) may be repeated in the next N RBs (e.g., RB4-RB7). If the number of repetitions is N and the number of available RBs is kN, then the repeated portions of the transmission may be 1/k portions of the transmission. If coherence bandwidth is greater than 1 RB, signal combining may be done. The same data scrambling should be used across the RBs with the repetition and pilots (e.g., UE-RS).

Alternatively, the entire transmission can be allocated over k RBs and then repeated. For example, as shown in FIG. 17, the first portion of the transmission can be transmitted in RB0 and the second portion of the transmission can be transmitted in RB1. The transmission is repeated in RB2 and RB3, RB4 and RB5, RB6 and RB7, and so on.

Example ACK/NACK Bundling and Multiplexing

According to certain aspects, ACK/NACK feedback for multiple subframes can be bundled (e.g., similar to PUCCH format 1b). For example, instead of sending an ACK/NACK in subframe n+4 for a transmission in subframe n, the UE can provide the ACK/NACK in subframe n+4+Δ, where Δ may be a defined value. In this case, the ACK/NACK may provide feedback for multiple subframes. The UE may send an ACK if transmissions in all of the subframes for which feedback is being provided were correctly received or a NACK if any of the transmissions failed.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications at a user equipment (UE), comprising:
  receiving, from a base station (BS), downlink control information (DCI) including a resource allocation indicating frequency resources within a system bandwidth to monitor for a transmission, wherein, for a data transmission, the DCI comprises:
    an index of a starting narrowband region within a block of a plurality of narrowband regions;
    a bitmap indicating one or more indexes of one or more narrowband regions of the plurality of narrowband regions; and an indication of a same one or more resource blocks (RBs) to monitor within the starting narrowband region and the one or more narrowband regions;

monitoring for the data transmission on the indicated one or more RBs within the starting narrowband region and the one or more narrowband regions;

determining different frequency resources to monitor for repetitions of the data transmission, wherein the different frequency resources for each repetition of the data transmission are frequency hopped among a plurality of blocks of the narrowband regions; and monitoring for the repetitions of the data transmission on the different frequency resources.

2. The method of claim 1, wherein, for a control transmission, frequency resources to monitor for the control transmission comprise a single narrowband region within one of the blocks of narrowband regions, and wherein the method further comprises monitoring the single narrowband region for the control transmission.

3. The method of claim 2, further comprising:
determining different narrowband regions to monitor for different control transmissions, wherein the different narrowband regions are frequency hopped to any narrowband region in the system bandwidth; and
monitoring the different narrowband regions for the different control transmissions.

4. The method of claim 1, further comprising:
providing an indication of a maximum bandwidth capability of the UE to monitor within for a transmission.

5. The method of claim 1, wherein:
the block of narrowband regions consists of four narrowband regions;
the bitmap comprises three bits indicating one or more bits of a remaining three narrowband regions in the block of narrowband regions after the starting narrowband region;
each narrowband region comprises six RBs; and
the indication of the same one or more RBs to monitor within each of the indicated narrowband regions comprises five bits.

6. A method for wireless communications at a user equipment (UE), comprising:
receiving, from a base station (BS), a resource allocation indicating frequency resources within one or more configured narrowband regions of a system bandwidth to monitor for a transmission, wherein:
the system bandwidth includes a plurality of blocks of the narrowband regions,
each block of the narrowband regions includes one or more contiguous narrowband regions,
each narrowband region comprises a fixed number of resource blocks (RBs),
for a data transmission, the resource allocation indicates any of the one of more contiguous narrowband regions to monitor for the data transmission,
the resource allocation further indicates different frequency resources for repetitions of the data transmission,
the different frequency resources are frequency hopped to any narrowband region in the system bandwidth,
the different frequency resources include a first number of narrowband regions at one end of the system bandwidth and a second number of narrowband regions at another end of the system bandwidth, and
determining a larger of the first number and the second number of narrowband regions to monitor for the repetitions;

monitoring for the data transmission on the indicated frequency resources within the one or more narrowband regions of the system bandwidth; and monitoring for the repetitions of the data transmission on the different frequency resources.

7. A method for wireless communications at a base station (BS), comprising:
providing downlink control information (DCI) to a user equipment (UE) allocating frequency resources within a system bandwidth for transmission, wherein the DCI comprises:
an index of a starting narrowband region within a block of a plurality of narrowband regions;
a bitmap indicating one or more indexes of one or more narrowband regions of the plurality of narrowband regions; and
an indication of a same one or more resource blocks (RBs) to monitor within the starting narrowband region and the one or more narrowband regions for a data transmission;
sending the data transmission on the one or more RBs within the starting narrowband region and the one or more narrowband regions; and
allocating different frequency resources for repetitions of the data transmission, wherein the different frequency resources for each repetition of the data transmission are frequency hopped among a plurality of blocks of narrowband regions.

8. The method of claim 7, wherein, for a control transmission, frequency resources to monitor for the control transmission comprises a single narrowband region within one of the blocks of narrowband regions, and wherein the method further comprises monitoring the single narrowband region for the control transmission.

9. A method for wireless communications at a base station (BS), comprising:
allocating frequency resources, within one or more configured narrowband regions of a system bandwidth, for transmission, wherein:
the system bandwidth comprises a plurality of blocks of narrowband regions;
each block of narrowband regions comprises one or more contiguous narrowband regions;
each narrowband region comprises a fixed number of resource blocks (RBs); and
for a data transmission, the resource allocation indicates any of the one or more contiguous narrowband regions within the system bandwidth to monitor for the data transmission;
allocating different frequency resources for repetitions of the data transmission, wherein:
the different frequency resources are frequency hopped to any narrowband region in the system bandwidth; and
the different frequency resources includes a first number of narrowband regions one end of the system bandwidth and a second number of narrowband regions at another end of the system bandwidth;
providing a resource allocation to a user equipment (UE) indicating the allocated frequency resources; and
sending the data transmission and the repetitions of the data transmission on the allocated frequency resources within the one or more narrowband regions of the system bandwidth.

10. An apparatus for wireless communications, comprising:
a memory comprising instructions; and
at least one processor configured to execute the instructions and cause the apparatus to:
receive, from a base station (BS), downlink control information (DCI) including a resource allocation indicating frequency resources within a system bandwidth to monitor for a transmission, wherein for a data transmission, the DCI comprises:
an index of a starting narrowband region within a block of a plurality of narrowband regions;
a bitmap indicating one or more indexes of the plurality of narrowband regions; and
an indication of a same one or more resource blocks (RBs) to monitor within the starting narrowband region and the one or more narrowband regions;
monitor for the data transmission on the indicated one or more RBs within the starting narrowband region and the one or more narrowband regions;
determine different frequency resources to monitor for repetitions of the data transmission, wherein the different frequency resources for each of the repetitions of the data transmission are frequency hopped among a plurality of blocks of the narrowband regions; and
monitor for the repetitions of the data transmission on the different frequency resources.

11. The apparatus of claim 10, further comprising:
a transceiver via which the resource allocation is received and the data transmission and the repetitions of the data transmission are being monitored for, wherein the apparatus is configured as a user equipment (UE).

* * * * *